United States Patent
Pan et al.

(10) Patent No.: US 11,983,921 B2
(45) Date of Patent: May 14, 2024

(54) HUMAN ABNORMAL BEHAVIOR RESPONSE METHOD AND MOBILITY AID ROBOT USING THE SAME

(71) Applicant: UBKang (Qingdao) Technology Co., Ltd., Qingdao (CN)

(72) Inventors: Matthew Keith Xi-Jie Pan, North Vancouver (CA); Dan Shao, San Gabriel, CA (US); Chuqiao Dong, Pasadena, CA (US); Zhen Xiu, Chino Hills, CA (US); Huan Tan, Pasadena, CA (US)

(73) Assignee: UBKANG (QINGDAO) TECHNOLOGY CO., LTD., Qingdao (CN)

( * ) Notice: Subject to any disclaimer, the term of this patent is extended or adjusted under 35 U.S.C. 154(b) by 135 days.

(21) Appl. No.: 17/385,843

(22) Filed: Jul. 26, 2021

(65) Prior Publication Data
US 2023/0026074 A1     Jan. 26, 2023

(51) Int. Cl.
| | |
|---|---|
| *G06V 20/10* | (2022.01) |
| *G06V 20/59* | (2022.01) |
| *G06V 10/22* | (2022.01) |
| *G06V 40/20* | (2022.01) |
| *G06V 40/16* | (2022.01) |
| *G06F 18/214* | (2023.01) |

(52) U.S. Cl.
CPC ............ *G06V 20/10* (2022.01); *G06F 18/214* (2023.01); *G06V 10/235* (2022.01); *G06V 40/164* (2022.01); *G06V 40/171* (2022.01); *G06V 40/25* (2022.01)

(58) Field of Classification Search
CPC ............ G06V 20/597; A61H 2003/046; A61H 2003/043; A61H 3/04
See application file for complete search history.

(56) References Cited

U.S. PATENT DOCUMENTS

| | | | |
|---|---|---|---|
| 8,725,311 B1 * | 5/2014 | Breed ..................... | A61B 5/11 701/1 |
| 10,227,003 B1 * | 3/2019 | Sanchez ................. | G08B 21/06 |
| 11,188,074 B1 * | 11/2021 | Benavidez ........... | G05D 1/0044 |
| 2016/0090097 A1 * | 3/2016 | Grube ................... | B60W 40/08 340/576 |
| 2017/0140232 A1 * | 5/2017 | Banno .................. | A61B 5/1128 |
| 2017/0154394 A1 * | 6/2017 | Kan .................... | G06Q 10/0635 |
| 2017/0225038 A1 * | 8/2017 | Wei .................... | A63B 22/0242 |
| 2018/0057034 A1 * | 3/2018 | Deshpande ............ | B62B 5/002 |
| 2018/0096475 A1 * | 4/2018 | Jemander ............. | G01S 13/582 |
| 2018/0257682 A1 * | 9/2018 | Brooks .................. | B61L 3/006 |

(Continued)

*Primary Examiner* — Frank Johnson

(57) ABSTRACT

Response methods to human abnormal behaviors for a mobility aid robot having a user-facing camera are disclosed. The mobility aid robot responds to human abnormal behaviors by detecting a face of a human during the robot aiding the human to move through the camera, comparing an initial size of the face and an immediate size of the face in response to the face of the human having detected during the robot aiding the human to move, determining the human as in abnormal behavior(s) in response to the immediate size of the face being smaller than the initial size of the face, and performing response(s) corresponding to the abnormal behavior(s) in response to the human being in the abnormal behavior(s), where the response(s) include slowing down the robot.

20 Claims, 10 Drawing Sheets

(56) References Cited

U.S. PATENT DOCUMENTS

| | | | |
|---|---|---|---|
| 2019/0142684 A1* | 5/2019 | Liang | A61H 1/00 |
| | | | 135/66 |
| 2019/0147263 A1* | 5/2019 | Kuehnle | G07C 5/0866 |
| | | | 340/439 |
| 2019/0213429 A1* | 7/2019 | Sicconi | G06F 3/167 |
| 2019/0365592 A1* | 12/2019 | Norton | A61H 3/04 |
| 2021/0024146 A1* | 1/2021 | Ohta | B60W 50/14 |
| 2021/0073522 A1* | 3/2021 | Sugawara | A61B 5/1128 |
| 2022/0027646 A1* | 1/2022 | Giralt | G08B 29/20 |
| 2022/0110818 A1* | 4/2022 | Orrell-Jones | A61G 5/0825 |

* cited by examiner

HUMAN ABNORMAL BEHAVIOR RESPONSE METHOD AND MOBILITY AID ROBOT USING THE SAME

BACKGROUND

1. Technical Field

The present disclosure relates to robots, particularly to a human abnormal behavior response method and a mobility aid robot using the same.

2. Description of Related Art

Mobility aids are a series of devices such as rollators and walkers targeted towards people with reduced mobility. Typically, these devices are used by populations with varying degrees of mobility impairment due to issues related to aging, such as reduced skeletal mass, reduction of joint motion and increased stiffness, arthritis, surgical implants, and neuromuscular impairment. Users of such devices typically include seniors and those undergoing rehabilitation due to stroke or other trauma impairing normal motor function.

With the help of flourishing artificial intelligence (AI) techniques and applications in various industries, mobility aid robots can be developed to realize the function of mobility aids in a more automated and even intelligent way. As mobility aid robots are targeted towards users that are senior with age, for the safety and/or user experience of the aged user, the types of (abnormal) behaviors that will generally be interested in detecting include: not keeping up with the robot, having abandoned the robot, elevated stress, physical exhaustion, and drowsiness.

Although there are many research studies examining individual abnormal behavior of humans, there is still a lack of a mechanism for detecting and responding to the abnormal behaviors of human that is especially adaptable to the structure and functions of a mobility aid robot.

BRIEF DESCRIPTION OF THE DRAWINGS

In the drawing(s), the same element will be designated using the same or similar reference numerals throughout the figures. It should be understood that the drawings in the following description are only examples of the present disclosure. For those skilled in the art, other drawings can be obtained based on these drawings without creative works.

DETAILED DESCRIPTION

Figure 1:
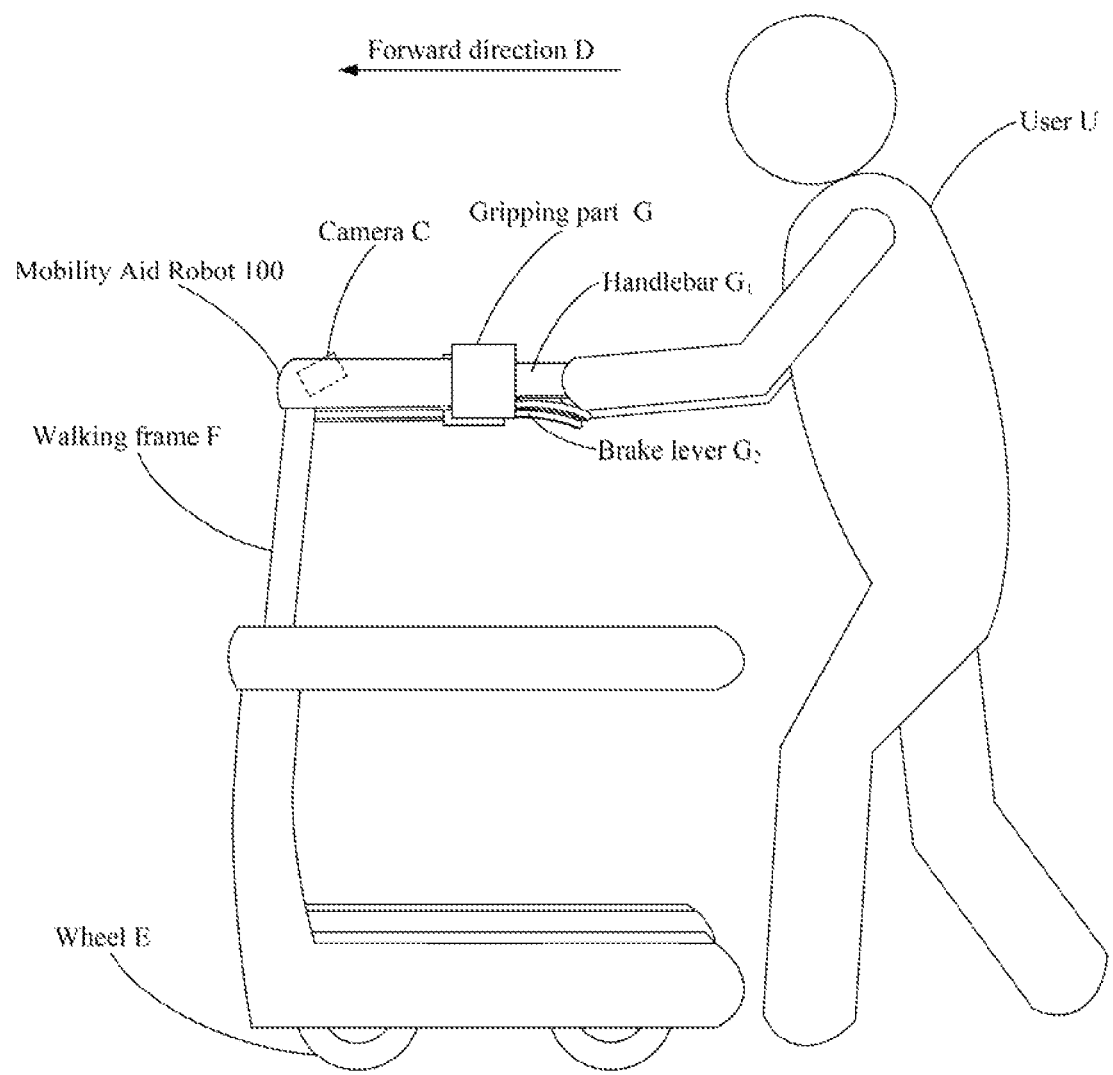
FIG. 1 is a schematic diagram of a scenario of a mobility aid robot aiding a human to move according to some embodiments of the present disclosure.

In order to make the objects, features and advantages of the present disclosure more obvious and easy to understand, the technical solutions in this embodiment will be clearly and completely described below with reference to the drawings. All other embodiments obtained by those skilled in the art based on the embodiments of the present disclosure without creative efforts are within the scope of the present disclosure.

It is to be understood that, when used in the description and the appended claims of the present disclosure, the terms "including", "comprising", "having" and their variations indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

In the present disclosure, the terms "first", "second", and "third" are for descriptive purposes only, and are not to be comprehended as indicating or implying the relative importance or implicitly indicating the amount of technical features indicated. Thus, the feature limited by "first", "second", and "third" may include at least one of the feature either explicitly or implicitly. In the description of the present disclosure, the meaning of "a plurality" is at least two, for example, two, three, and the like, unless specifically defined otherwise.

In the present disclosure, the descriptions of "one embodiment", "some embodiments" or the like described in the specification mean that one or more embodiments of the present disclosure can include particular features, structures, or characteristics which are related to the descriptions of the descripted embodiments. Therefore, the sentences "in one embodiment", "in some embodiments", "in other embodiments", "in other embodiments" and the like that appear in different places of the specification do not mean that descripted embodiments should be referred by all other embodiments, but instead be referred by "one or more but not all other embodiments" unless otherwise specifically emphasized.

The present disclosure relates to human abnormal behavior detection. As used herein, the term "mobility aid robot" refers to a mobile robot that has the capability to aid its user in moving, which may have structure like, for example, a rollator, a walker, or a wheelchair. The term "human" refers to the most populous and widespread species of primates in the earth. A human has a body including a head, a neck, a trunk, arms, hands, legs and feet. The term "abnormal behavior" refers to a behavior of human that will cause the operation of a mobile robot to be affected, for example, the human not keeping up with the robot, abandoning use of the robot, and drowsiness causing impaired operation of the robot. The term "sensor" refers to a device, module, machine, or subsystem such as ambient light sensor and image sensor (e.g., camera) whose purpose is to detect events or changes in its environment and send the information to other electronics (e.g., processor).

FIG. 1 is a schematic diagram of a scenario of a mobility aid robot 100 aiding a user U to move according to some embodiments of the present disclosure. In some embodiments, the mobility aid robot 100 may be a mobile robot such as a wheeled robot, which may include a walking frame F, gripping parts G, wheels E, and a camera C, and therefore have a structure like a rollator. It should be noted that, the mobility aid robot 100 is only one example of mobility aid robot, and the mobility aid robot 100 may have more, fewer, or different parts than shown in above or below (e.g., have legs rather than the wheels E), or may have a different configuration or arrangement of the parts (e.g., have a single gripping part such as a grip bar).

The camera C is disposed toward (an upper part of) the body of the user U so as to shoot a face of the user U by, for example, (adjustably) disposing the camera C to straightly face toward the face of the user U. In some embodiments, the position and/or the pitch angle of the camera C may be automatically or manually adjusted so as to point toward the face of the user U, or point toward a forward direction D which the mobility aid robot 100 straightly moves so as to navigate the mobility aid robot 100 to the user U first before assisting the user U to move.

The gripping parts G are attached to an upper edge of the walking frame F for the user U to grip, and the wheels E are attached to a bottom (e.g., a chassis) of the walking frame F for moving the walking frame F, so that the user U can be supported by the mobility aid robot 100 to stand and move with the assistance of the mobility aid robot 100. The height of the walking frame F may be automatically or manually adjusted by, for example, telescoping mechanisms in the walking frame F such as telescopic rods so that the gripping parts G meet a height convenient for the user U to grip. The gripping parts G may include a pair of handlebars $G_1$ disposed in parallel for the user U to grip through two hands and brake levers $G_2$ mounted on the handlebars $G_1$ for the user U to brake the mobility aid robot 100 through the two hands, and may also include related parts such as Bowden cables. The gripping parts G are disposed toward a direction basically counter to the forward direction D such that the handlebars $G_1$ extend toward (a middle part of) a body of the user U for the user U to grip.

The mobility aid robot 100 may be navigated in its environment (e.g., a living room) to, for example, perform a walking aid (walking assist) task (and other assisting tasks such as parking for pick up and parking for interaction), so that the user U can move with the assistance of the mobility aid robot 100, while dangerous situations such as collisions and unsafe conditions (e.g., falling, extreme temperature, radiation, and exposure) may be prevented. In this indoor navigation, the mobility aid robot 100 is navigated automatically, semi-automatically, or manually from a starting point (e.g., a position in a living room) that is, the location where the mobility aid robot 100 initially locates, to a destination (e.g., a position in a bedroom), that is, the location of the goal of navigation which is indicated by the user Li or the navigation/operation system of the mobility aid robot 100), while obstacles (e.g., walls, furniture, humans, pets, and garbage) may be avoided so as to prevent the above-mentioned dangerous situations. The trajectory for the mobility aid robot 100 to move from the starting point to the destination may be planned so as to move the mobility aid robot 100 according to the trajectory. The trajectory may be planned according to, for example, a shortest path in the built map to the destination. In addition, the collision avoidance to obstacles in the built map (e.g., walls and furniture) or that detected in real time (e.g., humans and pets) may also be considered when planning, so as to accurately and safely navigate the mobility aid robot 100.

Figure 2:
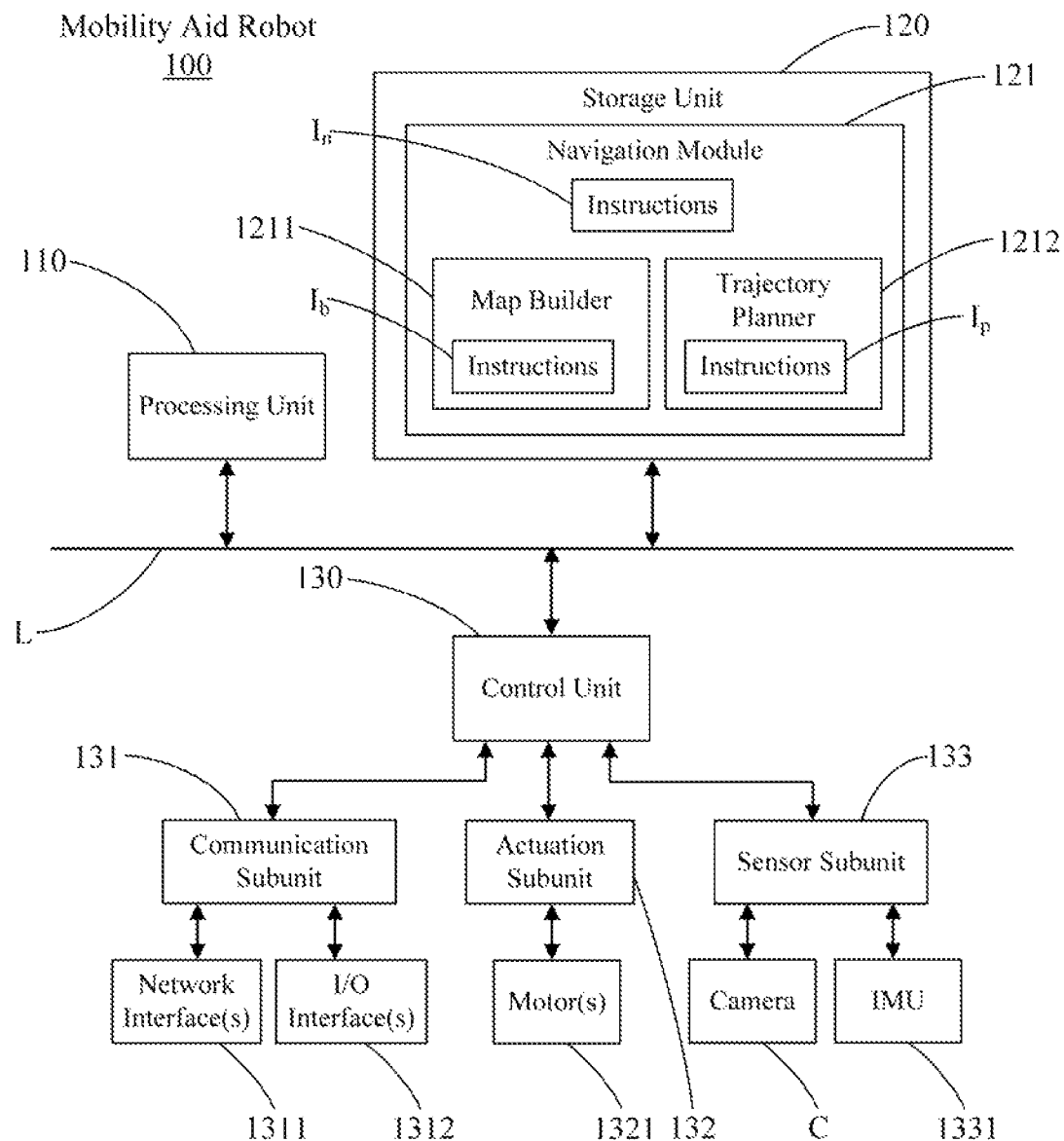
FIG. 2 is a schematic block diagram illustrating the mobility aid robot of FIG. 1.

FIG. 2 is a schematic block diagram illustrating the mobility aid robot 100 of FIG. 1. The mobility aid robot 100 may include a processing unit 110, a storage unit 120, and a control unit 130 that communicate over one or more communication buses or signal lines L. It should be noted that, the mobility aid robot 100 is only one example of mobility aid robot, and the mobility aid robot 100 may have more or fewer components (e.g., unit, subunits, and modules) than shown in above or below, may combine two or more components, or may have a different configuration or arrangement of the components. The processing unit 110 executes various (sets of) instructions stored in the storage unit 120 that may be in form of software programs to perform various functions for the mobility aid robot 100 and to process related data, which may include one or more processors (e.g., CPU). The storage unit 120 may include one or more memories (e.g., high-speed random access memory (RAM) and non-transitory memory), one or more memory controllers, and one or more non-transitory computer readable storage media (e.g., solid-state drive (SSD) or hard disk drive). The control unit 130 may include various controllers (e.g., camera controller, display controller, and physical button controller) and peripherals interface for coupling the input and output peripheral of the mobility aid robot 100, for example, external port (e.g., USB), wireless communication circuit (e.g., RF communication circuit), audio circuit (e.g., speaker circuit), sensor (e.g., inertial measurement unit (IMU)), and the like, to the processing unit 110 and the storage unit 120. In some embodiments, the storage unit 120 may include a navigation module 121 for implementing navigation functions (e.g., map building and trajectory planning) related to the navigation (and trajectory planning) of the mobility aid robot 100, which may be stored in the one or more memories (and the one or more non-transitory computer readable storage media).

The navigation module 121 in the storage unit 120 of the mobility aid robot 100 may be a software module (of the operating system of the mobility aid robot 100), which has instructions $I_n$ (e.g., instructions for actuating motor(s) 1321 of the mobility aid robot 100 to move the mobility aid robot 100) for implementing the navigation of the mobility aid robot 100, a map builder 1211, and trajectory planner(s) 1212. The map builder 1211 may be a software module having instructions $I_b$ for building map for the mobility aid robot 100. The trajectory planner(s) 1212 may be software module(s) having instructions $I_p$ for planning trajectories for the mobility aid robot 100. The trajectory planner(s) 1212 may include a global trajectory planner for planning global trajectories for the mobility aid robot 100 and a local trajectory planner for planning local trajectories for the mobility aid robot 100. The global trajectory planner may be, for example, a trajectory planner based on Dijkstra's algorithm, which plans global trajectories based on map(s) built by the map builder 1211 through, for example, simultaneous localization and mapping (SLAM). The local trajectory planner may be, for example, a trajectory planner based on TEB (timed elastic band) algorithm, which plans local trajectories based on the global trajectory $P_g$, and other data collected by the mobility aid robot 100. For example, images may be collected through the camera C (or other forward-facing camera) of the mobility aid robot 100, and the collected images may be analyzed so as to identify obstacles, so that the local trajectory can be planned with reference to the identified obstacles, and the obstacles can be avoided by moving the mobility aid robot 100 according to the planned local trajectory. Each of the map builder 1211 and the trajectory planner(s) 1212 may be a submodule separated from the instructions $I_n$ or other submodules of the navigation module 121, or a part of the instructions $I_n$ for implementing the navigation of the mobility aid robot 100. The trajectory planner(s) 1212 may further have data (e.g., input/output data and temporary data) related to the trajectory planning of the mobility aid robot 100 which may be stored in the one or more memories and accessed by the processing unit 110. In some embodiments, each of the trajectory planner(s) 1212 may be a module in the storage unit 120 that is separated from the navigation module 121.

In some embodiments, the instructions $I_n$ may include instructions for implementing collision avoidance of the mobility aid robot 100 (e.g., obstacle detection and trajectory replanning). In addition, the global trajectory planner may replan the global trajectory(s) (i.e., plan new global trajectory(s)) to detour in response to, for example, the original global trajectory(s) being blocked (e.g., blocked by an unexpected obstacle) or inadequate for collision avoidance (e.g., impossible to avoid a detected obstacle when adopted). In other embodiments, the navigation module 121 may be a navigation unit communicating with the processing unit 110, the storage unit 120, and the control unit 130 over the one or more communication buses or signal lines L, and may further include one or more memories (e.g., high-speed random access memory (RAM) and non-transitory memory) for storing the instructions $I_n$, the map builder 1211, and the trajectory planner(s) 1212, and one or more processors (e.g., MPU and MCU) for executing the stored instructions $I_n$, $I_b$ and $I_p$ to implement the navigation of the mobility aid robot 100.

The mobility aid robot 100 may further include a communication subunit 131 and an actuation subunit 132. The communication subunit 131 and the actuation subunit 132 communicate with the control unit 130 over one or more communication buses or signal lines that may be the same or at least partially different from the above-mentioned one or more communication buses or signal lines L. The communication subunit 131 is coupled to communication interfaces of the mobility aid robot 100, for example, network interface(s) 1311 for the mobility aid robot 100 to communicate with the control device 200 via the network, I/O interface(s) 1312 (e.g., a physical button), and the like. The actuation subunit 132 is coupled to component(s)/device(s) for implementing the motions of the mobility aid robot 100 by, for example, actuating motor(s) 1321 of the wheels E and/or joints of the mobility aid robot 100. The communication subunit 131 may include controllers for the above-mentioned communication interfaces of the mobility aid robot 100, and the actuation subunit 132 may include controller(s) for the above-mentioned component(s)/device(s) for implementing the motions of the mobility aid robot 100. In other embodiments, the communication subunit 131 and/or actuation subunit 132 may just abstract component for representing the logical relationships between the components of the mobility aid robot 100.

The mobility aid robot 100 may further include a sensor subunit 133 which may include a set of sensor(s) and related controller(s), for example, the camera C and an IMU 1331 (or an accelerometer and a gyroscope), for detecting the environment in which it is located to realize its navigation. The sensor subunit 133 communicates with the control unit 130 over one or more communication buses or signal lines that may be the same or at least partially different from the above-mentioned one or more communication buses or signal lines L. In other embodiments, in the case that the navigation module 121 is the above-mentioned navigation unit, the sensor subunit 133 may communicate with the navigation unit over one or more communication buses or signal lines that may be the same or at least partially different from the above-mentioned one or more communication buses or signal lines L. In addition, the sensor subunit 133 may just abstract component for representing the logical relationships between the components of the mobility aid robot 100.

In some embodiments, the map builder 1211, the trajectory planner(s) 1212, the sensor subunit 133, and the motor(s) 1321 (and the wheels E and/or joints of the mobility aid robot 100 coupled to the motor(s) 1321) jointly compose a (navigation) system which implements map building, (global and local) trajectory planning, and motor actuating so as to realize the navigation of the mobility aid robot 100. In addition, the various components shown in FIG. 2 may be implemented in hardware, software or a combination of both hardware and software. Two or more of the processing unit 110, the storage unit 120, the control unit 130, the navigation module 121, and other units/subunits/modules may be implemented on a single chip or a circuit. In other embodiments, at least a part of them may be implemented on separate chips or circuits.

Figure 3:
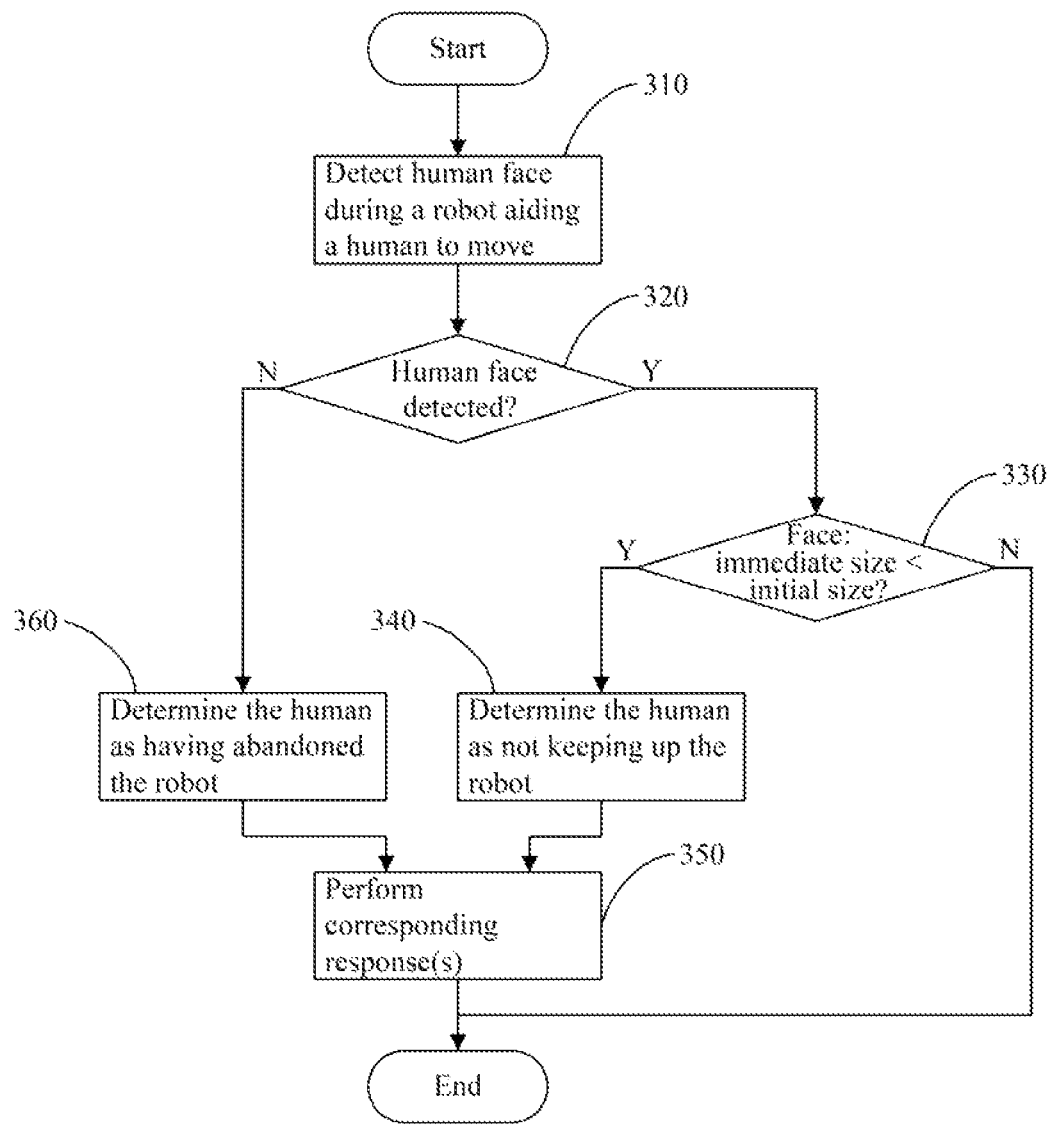
FIG. 3 is a flow chart of an example of responding human abnormal behaviors using the mobility aid robot of FIG. 2.

FIG. 3 is a flow chart of an example of responding human abnormal behaviors using the mobility aid robot 100 of FIG. 2. A human abnormal behavior response method for the mobility aid robot 100 equipped with the user-facing camera C. In some embodiments, the human abnormal behavior response method is implemented in the mobility aid robot 100 to respond to abnormal behaviors of the user U so as to perform a specified task (e.g., walking aid) on the user U by, for example, storing (sets of) the instructions $I_n$ corresponding to the human abnormal behavior response method as the navigation module 121 in the storage unit 120 and executing the stored instructions $I_n$ through the processing unit 110, and then the mobility aid robot 100 may respond to the abnormal behaviors of the user U while being navigated. The human abnormal behavior response method may be performed in response to, for example, a request for responding to an abnormal behavior of the user U from, for example, (the navigation/operation system of) the mobility aid robot 100 itself.

Accordingly, at step 310, the face of the user U is detected during the mobility aid robot 100 aiding the user U to move through the camera C of the mobility aid robot 100. The mobility aid robot 100 may start assisting the user U to move while the above-mentioned navigation of the mobility aid robot 10 begins, and end aiding the user U while the above-mentioned navigation ends. The camera C produces image(s) by shooting the face of the user U, and the face of the user U in the image is detected using a predefined machine-learned model that may be a computer model based on, for example, YOLO (you only look once) algorithm. The machine-learned model is trained by using a large set of labeled data with respect to the detection of human face (e.g., a data set of more than 10,000 images of human faces in various scenes), and neural network architectures that contain a plurality of layers, so as to learn to perform classification tasks directly from the inputted image, thereby detecting the lace of the user U in the image. A plurality of images may be produced so as to select one image (e.g., the image that meets a certain quality) for use. In some embodiments, the camera C may be an RGB camera, which produces RGB images each including pixels each represented as red, green and blue colors. In other embodiments, the camera C may be a range camera (e.g., RGB-D camera), which produces range images each including color data for representing the colors of pixels in image and depth data for representing the distance to the scene object (e.g., human face) in image.

Figure 5:
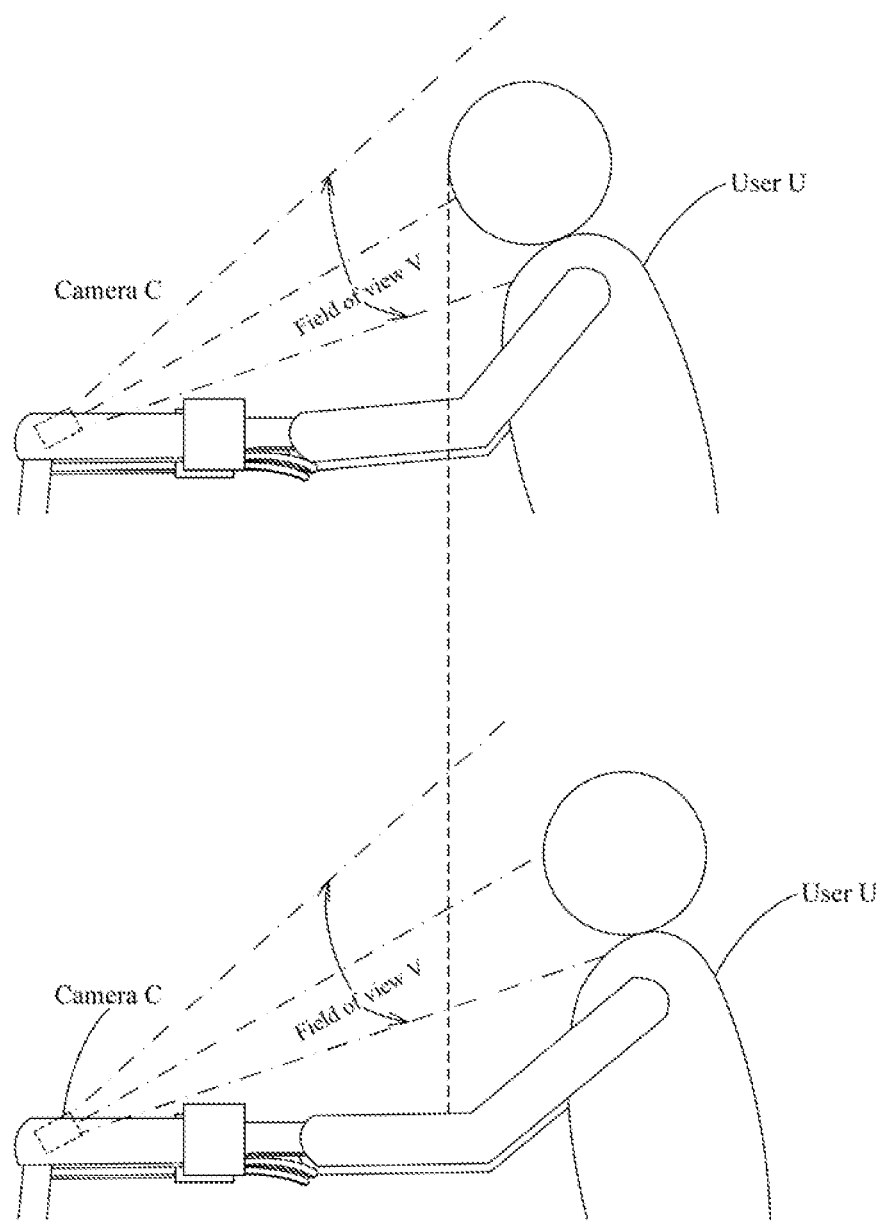
FIG. 5 is a schematic diagram illustrating human not keeping up with the mobility aid robot of FIG. 2.

At step 320, a determination is made whether or not the face of the user U has been detected, that is, there is a human face in the produced image (i.e., the face of the user U is in a field of view (FOV) V of the camera C, see FIG. 5), during the mobility aid robot 100 aiding the user U to move. If yes, step 330 will be performed; otherwise, step 360 will be performed. At step 330, a determination is made whether or not an immediate size of the face is smaller than an initial size of the face. The initial size of the face is the size of the face at a moment that the mobility aid robot 100 starts to assist the user U to move, and the immediate size of the face is the size of the face after the moment. If yes, step 340 will be performed; otherwise, the method will be ended.

Figure 4:
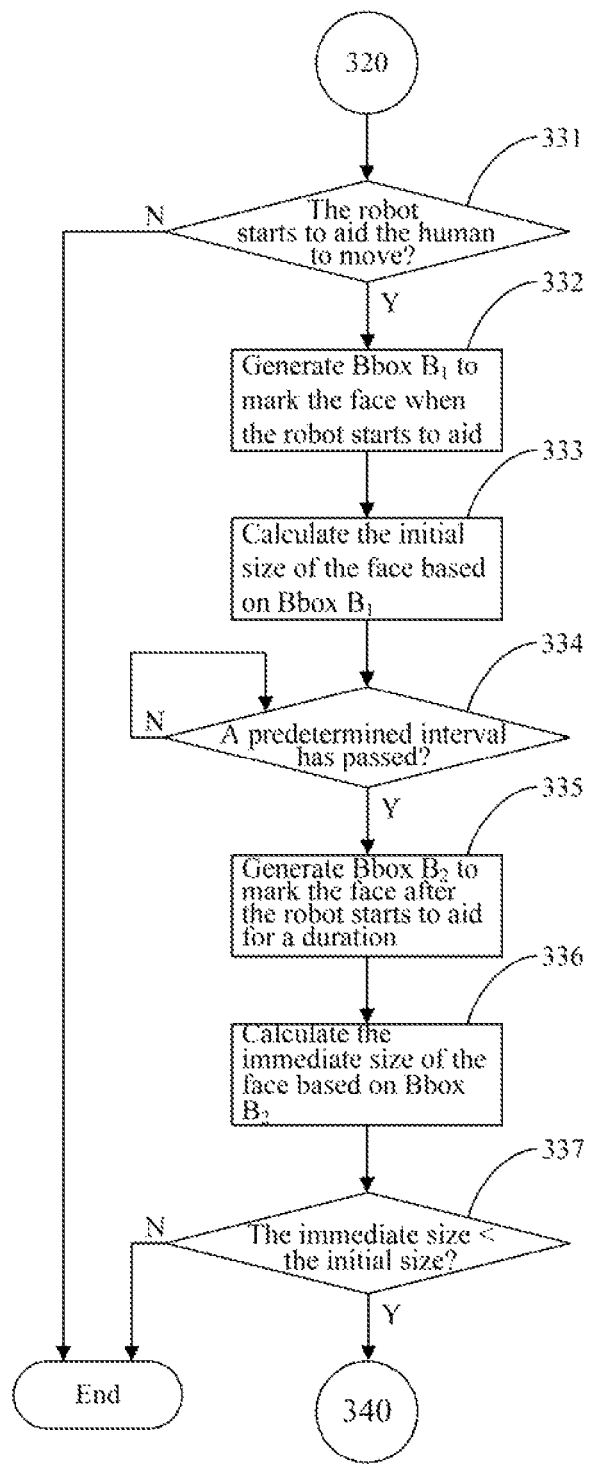
FIG. 4 is a flow chart of an example of comparing the initial size and the immediate size of human face in the example of responding of FIG. 3.

In some embodiments, the comparison of the immediate size and the initial size of the face may be implemented based on bounding box (Bbox). FIG. 4 is a flow chart of an example of comparing the initial size and the immediate size of the face of the user U (step 330) in the example of responding of FIG. 3. Steps 331-337 implement the above-mentioned comparison of the initial size and the immediate size of the face (step 330). Accordingly, at step 331, a determination is made whether or not the mobility aid robot 100 starts to assist the user U to move. If yes, step 332 will be performed; otherwise, the method will be ended. At step 332, a first bounding box $B_1$ is generated using the above-mentioned machine-learned model to mark the face in an image produced by the camera at the above-mentioned moment that the mobility aid robot 100 starts to assist the user U to move. At step 333, the initial size of the face is calculated based on the first bounding box $B_1$. At step 334, a determination is made whether or not a predetermined interval has passed. The interval is an interval (e.g., 1 second) determined in advance that is for the camera C to re-produce the image of the face of the user U so as to detect the following change of the size of the face. If yes, step 335 will be performed; otherwise, step 334 will be re-performed. At step 335, a second bounding box $B_2$ is generated using the above-mentioned machine-learned model to mark the face in another image produced by the camera C after the above-mentioned moment. At step 336, the immediate size of the face is calculated based on the second bounding box $B_2$. At step 337, a determination is made whether or not the calculated immediate size of the face is smaller than the calculated initial size of the face. A threshold for the difference between the immediate size and the initial size may be defined so as to determine that the calculated immediate size is smaller than the calculated initial size only when the difference therebetween is equal to or greater than the threshold. If yes, step 340 will be performed (or back to step 334 until the mobility aid robot 100 ends aiding the user U); otherwise, the method will be ended. In some embodiments, more images can be produced in sequence by the camera C to generate bounding boxes to mark the face in the images so as to calculate the immediate size of the face in each image based on the generated bounding boxes, thereby determining whether the calculated immediate size of the face in each image is smaller than that of the face in its previous image, that is, determining whether the face of the user U appears to be getting smaller.

In other embodiments, the comparison of the immediate size and the initial size of the face may be implemented based on a distance between the pupils on the face of the user U, that is, a preset inter-pupillary distance (IPD). For example, the IPD may be taken as the size of the face, the size of the IPD at a moment that the mobility aid robot 100 starts to assist the user U to move may be taken as the initial size of the face, and the size of the IPD after the moment may be taken as the immediate size of the face. Furthermore, given an intrinsic of the camera C (e.g., focal length), the distance of the face from the camera C may be calculated based on the measured IPDs that are taken as the initial size and the immediate size of the face, thereby determining whether the calculated immediate size of the face in each image is smaller than that of the face in its previous image.

FIG. 5 is a schematic diagram illustrating the user U not keeping up with the mobility aid robot 100 of FIG. 2. When the user U moves with the assistance of the mobility aid robot 100, the field of view (FOV) V of the camera C will cover the face of the user U. The height (e.g., 1 meter) of the camera C on the mobile machine 100 may be determined according to actual needs (e.g., larger height to have the larger field of view V and smaller height to have the smaller field of view V), and the pitch angle of the camera C with respect to the ground on which the mobile machine 100 is located may also be changed according to actual needs (e.g., larger pitch angle to have the nearer field of view V and smaller pitch angle to have the farer field of view V). Based on the height and the pitch angle of the camera C, a relative position of the face of the user U can be obtained, and then the posture of the user U can be determined.

As shown in the upper part of FIG. 5, if the user U is in a normal condition (without an abnormal behavior) that she/he can well move with the assistance of the mobility aid robot 100, the FOV V of the camera C will cover entirety of the face of the user U (in approximately the central part of the FOV V), and the immediate size of the face in image will generally be equal to or not much different from the initial size of the face in the image. As shown in the lower part of FIG. 5, if the user U has an abnormal behavior such as not keeping up with the mobility aid robot 100, although the FOV V of the camera C may still cover entirety or most of the face of the user U (in approximately the lower part of the FOV V), the immediate size of the face of the user U in image will be smaller than the initial size of the face in image because the face of the user U having the abnormal behavior is farther to the camera C than that of the user U in the normal condition.

At step 340, the user U is determined as in an abnormal behavior of not keeping up with the mobility aid robot 100. Because the immediate size of the face of the user U is smaller than the initial size of the face, the user U is judged as being dragged behind the mobility aid robot 100, that is, not keeping up with the mobility aid robot 100. In other embodiments, the user U may be judged as in another abnormal behavior which also causes the immediate size of the face smaller than the initial size of the face. At step 350, response(s) corresponding to the determined abnormal behavior are performed. In some embodiments, in the case that the user U is determined as not keeping up with the mobility aid robot 100, the mobility aid robot 100 may be slowed down so that the user U can keep up the mobility aid robot 100, suggest a break to the user U (e.g., by voice), and/or be stopped (if the user U is too far away).

At step 360, the user U is determined as in another abnormal behavior of having abandoned the mobility aid robot 100. Because the face of the user U has not been detected (i.e., the FOV V of the camera C not covers the face of the user U), the user U is judged as not in a correct position of moving with the assistance of the mobility aid robot 100, that is, the user U may have abandoned the mobility aid robot 100. In addition, it may determine that if the face of the user U has kept not being detected for a preset period of time. If so, the user may be determined as having abandoned the mobility aid robot 100, rather than not able to keep up with the pace of the mobility aid robot 100. Correspondingly, in some embodiments, at step 350, in the case that the user U is determined as having abandoned the mobility aid robot 100, the mobility aid robot 100 may be stopped because it does not need to assist the user U to move while the user U abandons the robot. In other embodiments, the abnormal behavior of having abandoned the mobility aid robot 100 may be taken as a special case of not keeping up with the mobility aid robot 100, because the corresponding immediate size of the face is 0, and stopping the mobility aid robot 100 is a special case of slowing down to the speed of 0.

Figure 6:
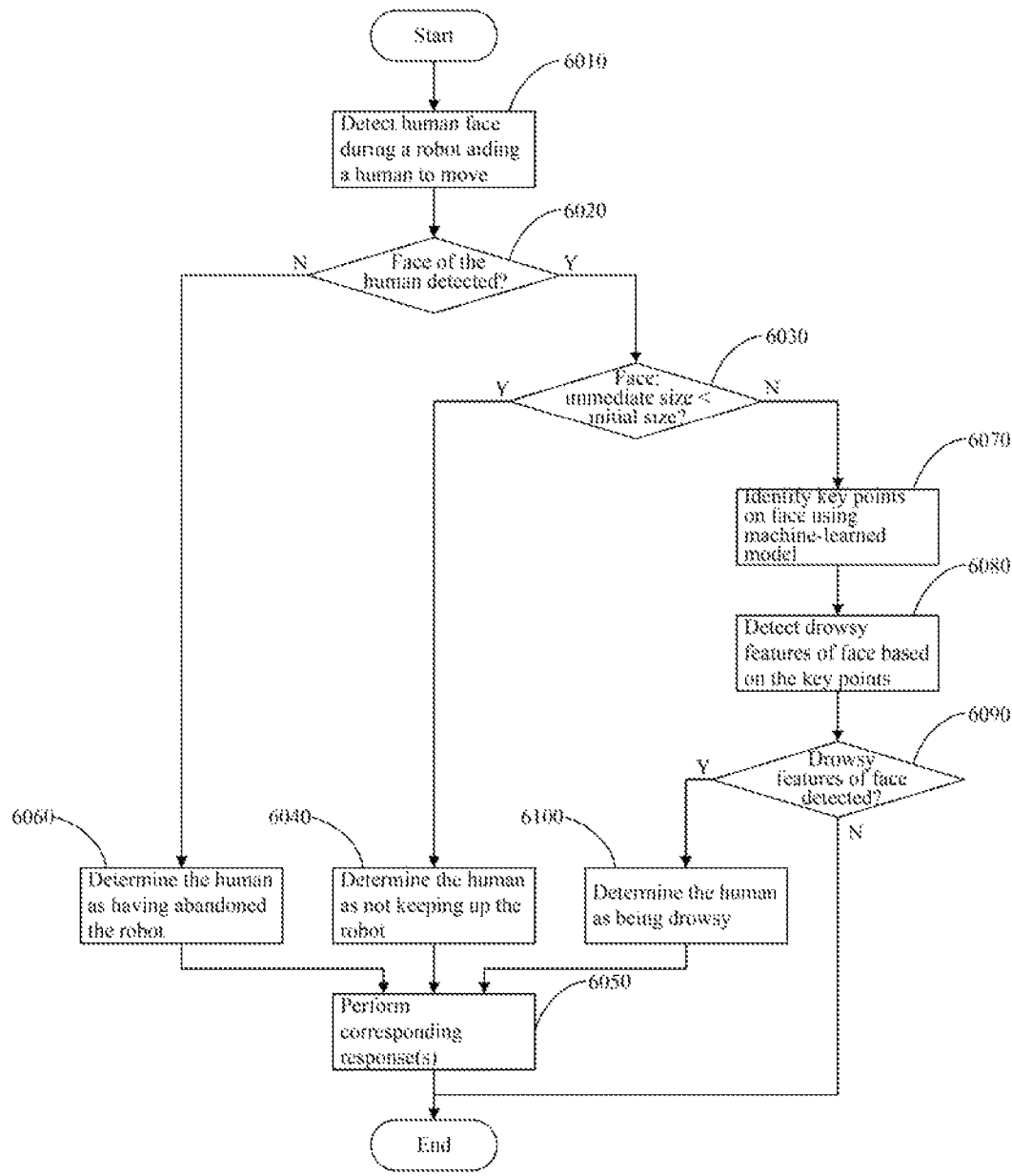
FIG. 6 is a flow chart of another example of the mobility aid robot of FIG. 2 responding to human abnormal behaviors.

FIG. 6 is a flow chart of another example of the mobility aid robot 100 of FIG. 2 responding to human abnormal behaviors. Another human abnormal behavior response method for the mobility aid robot 100 is implemented in the mobility aid robot 100 to respond to abnormal behaviors of the user U. In addition to responding to the abnormal behaviors of not keeping up with the mobility aid robot 100 and having abandoned the mobility aid robot 100 as in the above-mentioned human abnormal behavior response method of FIG. 3, this human abnormal behavior response method further responding the abnormal behavior of drowsiness. Steps 6010-6020 and steps 6040-6060 are equivalent to steps 310-320 and steps 340-360, respectively, and will not be described again herein.

Figure 7:
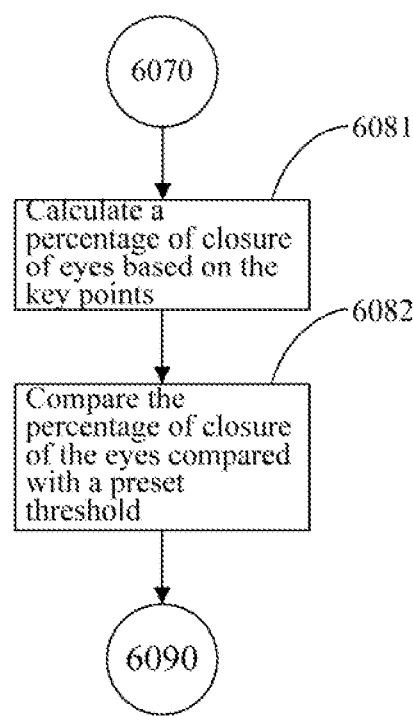
FIG. 7 is a flow chart of an example of detecting drowsy features of a face in the example of responding of FIG. 6.

Accordingly, at step 6030, a determination is made whether or not the immediate size of the face is smaller than the initial size of the face. If yes, step 6040 will be performed; otherwise, step 6070 will be performed. At step 6070, a plurality of key points on the face are identified using a predefined machine-learned model. The key points may correspond to the tip of nose, eye corners, and mouth. The process of using the machine-learned model to detect the face in the image produced by the camera C and identify (and locate) the key points on the face is so called "landmarking", and each of the key points is called a "landmark". The predefined machine-learned model may be the above-mentioned machine-learned model or another computer model based on, for example, YOLO algorithm. At step 6080, drowsy feature(s) of the face are detected based on the key points. The drowsy features represent drowsiness of the user U. FIG. 7 is a flow chart of an example of detecting drowsy features of face (step 6080) in the example of responding of FIG. 6. In some embodiments, the drowsy features may relate to a percentage of closure of eyes on the face of the user U over a preset time window. At step 6081, the percentage of closure of eyes on the face of the user U over the preset time window is calculated based on the key points. At step 6082, the percentage of closure of the eyes over the preset time window is compared with a preset threshold. If it greater than the threshold, which represents the drowsy feature relating to the percentage of closure of eyes on the face of the user U being greater than the preset threshold are detected.

Figure 8:
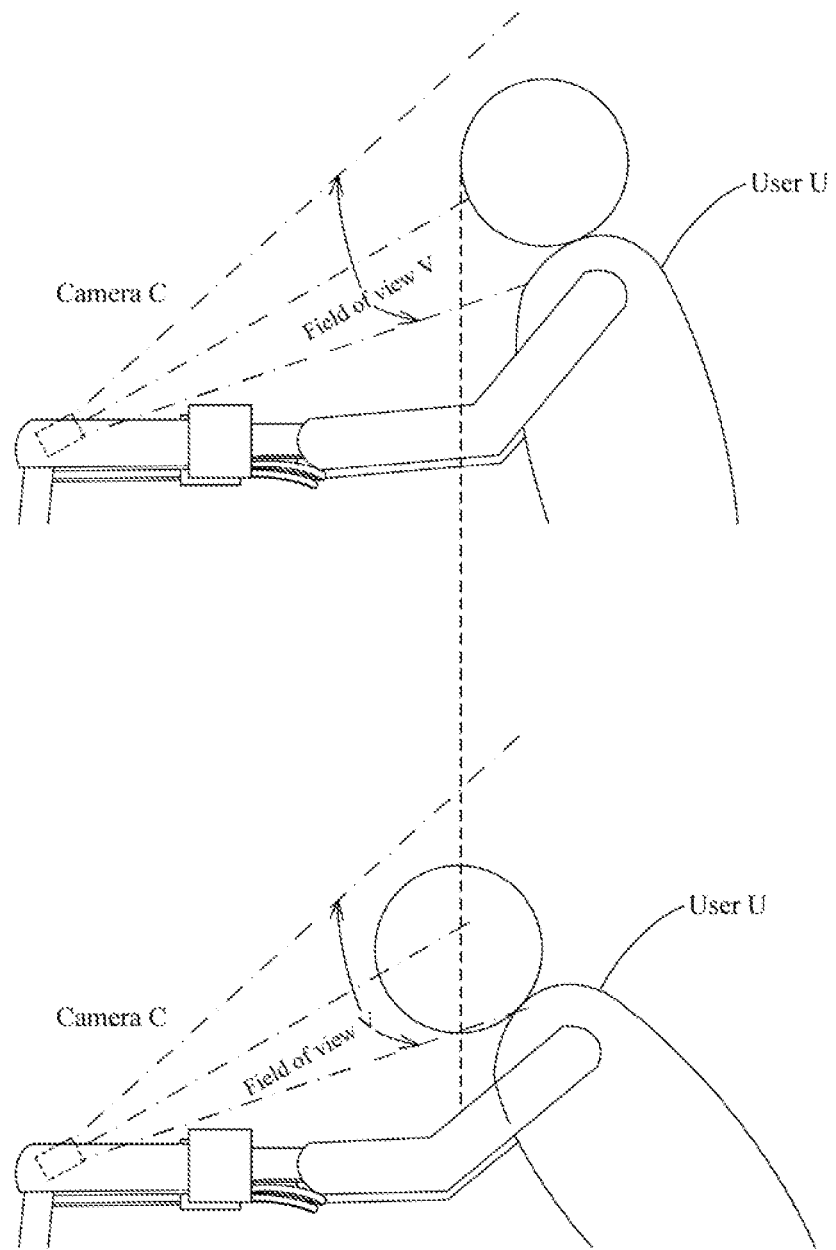
FIG. 8 is a schematic diagram illustrating a human being drowsy.

In other embodiments, the drowsy features may relate to drooping pose of the face of the user U. FIG. 8 is a schematic diagram illustrating the user U being drowsy. As shown in the upper part of FIG. 8, if the user U is in a normal condition (without an abnormal behavior) that she/he can well move with the assistance of the mobility aid robot 100, the face of the user U will be in a pose that the FOV V of the camera C may cover entirety of the face of the user U and the face may be in approximately the central part of the FOV V. As shown in the lower part of FIG. 8, if the user U has an abnormal behavior such as drowsiness, the face of the user U will be in a drooping pose that the FOV V of the camera C may not cover entirety of the face of the user U.

Figure 9:
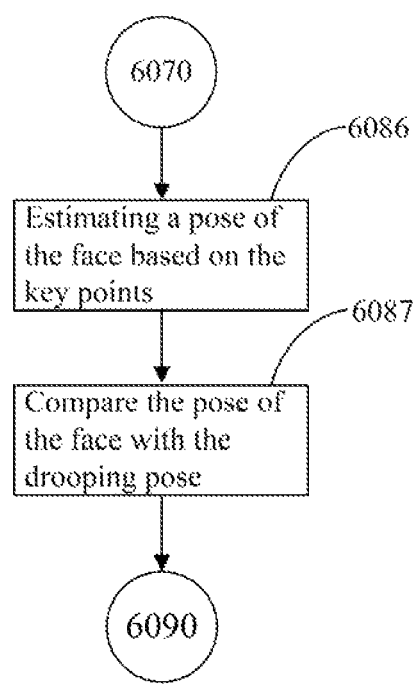
FIG. 9 is a flow chart of another example of detecting drowsy features of a face in the example of responding of FIG. 6.
Figure 10:
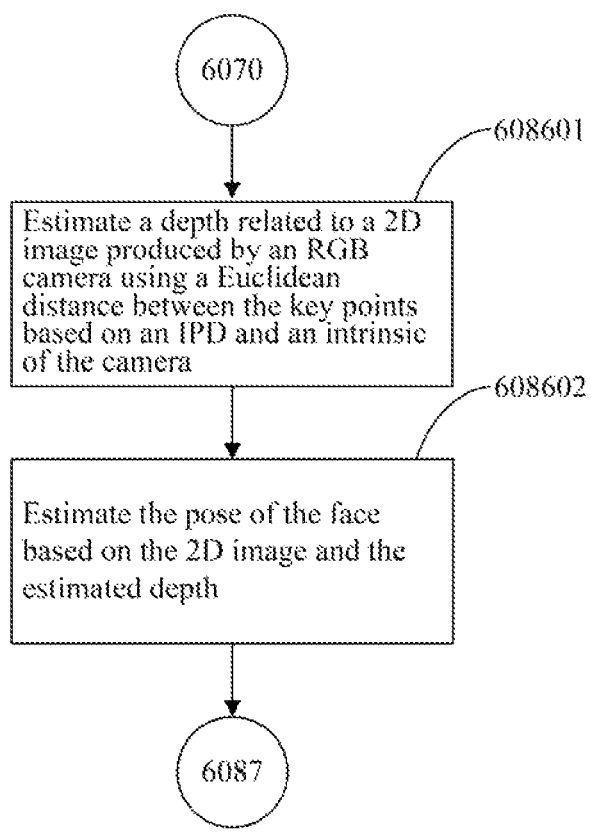
FIG. 10 is a flow chart of an example of estimating the pose of human face in the example of detection of FIG. 9.

FIG. 9 is a flow chart of another example of detecting drowsy features of a face (step 6080) in the example of responding of FIG. 6. In some embodiments, the drowsy features may relate to the pose (i.e., the position and the orientation) of the face of the user U. At step 6086, the pose of the face of the user U is estimated based on the key points. FIG. 10 is a flow chart of an example of estimating the pose of human face (step 6086) in the example of detection of FIG. 9. In the case that the camera C is an RGB camera which produces 2D (two dimensional) images, the pose of the face of the user U may be estimated based on an estimated depth related to the key points. At step 608601, a depth related to the 2D image produced by the camera C is estimated using a Euclidean distance between the key points based on the above-mentioned IPD and an intrinsic of the camera C. Since the IPD is a fairly invariant measure between people (people have an average IPD of 63 mm), it can be used to estimate the depth (precision of the estimated depth is within 5-10 cm, due to variance in the IPD between people) by combining with the known intrinsic of the camera C such as the focal length of the camera C, through an equation of:

the depth=the average IPD*the focal length/the IPD from the camera $C$ in pixels In the 2D image produced by the camera C, the IPD (i.e., the straight line distance between pupils) is measured in pixels. At step 608602, the pose of the face of the user U is estimated based on the 2D image(s) and the estimated depth. At step 6087, the pose of the face is compared with the drooping pose. If they are the same or similar, which represents the drowsy feature relating to the drooping pose of the face of the user U are detected. In other embodiments, the drowsy features may simply relate to the orientation of the face of the user U. For instance, the orientation of the face of the user U may be estimated (based on the key points) first, then the orientation of the face may be compared with a preset orientation threshold. If the orientation threshold is excessed, which represents the drowsy feature relating to the drooping pose of the face of the user U are detected.

At step 6090, a determination is made whether or not the drowsy feature(s) of the face have been detected. The drowsy feature(s) of the face may include the percentage of closure of eyes on the face of the user U being greater than the preset threshold and the detected drooping pose. If yes, step 6100 will be performed; otherwise, the method will be ended. At step 6100, the user U is determined as drowsy. Correspondingly, in some embodiments, at step 6050, in the case that the user U is determined as drowsy, the mobility aid robot 100 may be slowed down so that the user U can keep up the mobility aid robot 100, or the mobility aid robot 100 may perform other corresponding functions such as providing other interventions that may increase safety to the user U, for example, asking if the user U needs to take a seat and rest, shortening the navigation path, or navigated to the room of the user U.

The human abnormal behavior response method in FIG. 3 and FIG. 6 may be re-performed per, for example, a few seconds, during the mobility aid robot 100 aiding the user U to move so as to ensure that operation of the mobility aid robot 100 is safe and modulated. In addition, or preventing false positive detections of abnormal behavior, a confidence score scheme may be implemented to filter out the false positive detections. The confidence score can be computed using a weighted sum of detection factors, where the weights can be determined through supervised machine learning or hand tuning. Furthermore, non-visual based abnormal behavior detectors can also feed into the confidence score (e.g., heart rate sensing, grip force and torque sensing, skin conductivity, and motor current used to drive the motor(s) 1321 of the mobility aid robot 100), so as to detect one abnormal behavior using multiple streams of data rather than just one source.

The human abnormal behavior response methods for a mobility aid robot detect abnormal behaviors of a user using a user-facing camera pointed towards the user's face during operation of the robot and then respond correspondingly, thereby improving safety and usability of the robot. In addition, for the aged user, as the abnormal behaviors including not keeping up with the robot, having abandoned the robot, elevated stress, physical exhaustion, and drowsiness should be especially paid attention to, the human abnormal behavior response method is capable of ensuring the safety and even improving the user experience of the aged user by combining the detections and responses of the foregoing abnormal behaviors. Therefore, the interaction of a mobility aid robot will become more intelligent, personalized and safe by implementing the human abnormal behavior response methods.

It can be understood by those skilled in the art that, all or part of the method in the above-mentioned embodiment(s) can be implemented by one or more computer programs to instruct related hardware. In addition, the one or more programs can be stored in a non-transitory computer readable storage medium. When the one or more programs are executed, all or part of the corresponding method in the above-mentioned embodiment(s) is performed. Any reference to a storage, a memory, a database or other medium may include non-transitory and/or transitory memory. Non-transitory memory may include read only memory (ROM), programmable ROM (PROM), electrically programmable ROM (EPROM), electrically erasable programmable ROM (EEPROM), flash memory, solid-state drive (SSD), or the like. Volatile memory may include random access memory (RAM), external cache memory, or the like.

The processing unit 110 (and the above-mentioned processor) may include central processing unit (CPU), or be other general purpose processor, digital signal processor (DSP), application specific integrated circuit (ASIC), field-programmable gate array (FPGA), or be other programmable logic device, discrete gate, transistor logic device, and discrete hardware component. The general purpose processor may be microprocessor, or the processor may also be any conventional processor. The storage unit 120 (and the above-mentioned memory) may include internal storage unit such as hard disk and internal memory. The storage unit 120 may also include external storage device such as plug-in hard disk, smart media card (SMC), secure digital (SD) card, and flash card.

The exemplificative units/modules and methods/steps described in the embodiments may be implemented through software, hardware, or a combination of software and hardware. Whether these functions are implemented through software or hardware depends on the specific application and design constraints of the technical schemes. The above-mentioned navigation method and mobility aid robot may be implemented in other manners. For example, the division of units/modules is merely a logical functional division, and other division manner may be used in actual implementations, that is, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interfaces/devices, and may also be electrical, mechanical or in other forms.

The above-mentioned embodiments are merely intended for describing but not for limiting the technical schemes of the present disclosure. Although the present disclosure is described in detail with reference to the above-mentioned embodiments, the technical schemes in each of the above-mentioned embodiments may still be modified, or some of the technical features may be equivalently replaced, so that these modifications or replacements do not make the essence of the corresponding technical schemes depart from the spirit and scope of the technical schemes of each of the embodiments of the present disclosure, and should be included within the scope of the present disclosure.

What is claimed is:

1. A human abnormal behavior response method for a mobility aid robot, wherein the robot has at least a gripping part disposed toward a body of a human for the human to grip, and a camera disposed toward the body of the human to shoot a face of the human, and the method comprises:
    planning a trajectory for the robot to move from a starting point to a destination, and controlling the robot to move according to the trajectory;
    detecting, through the camera, the face of the human during the robot aiding the human to move;
    comparing an initial size of the face and an immediate size of the face in response to the face of the human having detected during the robot aiding the human to move;
    determining the human is in one or more abnormal behaviors in response to the immediate size of the face being smaller than the initial size of the face; and
    performing one or more responses corresponding to the one or more abnormal behaviors in response to the human being in the one or more abnormal behaviors, wherein the one or more responses include slowing down the robot;
    wherein the one or more abnormal behaviors comprise drowsiness, and the performing the one or more responses corresponding to the one or more abnormal behaviors in response to the human being in the one or more abnormal behaviors comprises:
    adjusting the trajectory in response to the human being drowsy;
    wherein before performing the one or more responses corresponding to the one or more abnormal behaviors, the method further comprises:
        filtering out a false positive detection from the one or more abnormal behaviors based on a confidence score and detecting results of non-visual based abnormal behavior detectors, wherein the detecting results comprises: a result of heart rate sensing, and results of grip force and torque sensing, skin conductivity, and a motor current used to drive the robot, and the confidence score is computed using a weighted sum of detection factors corresponding to the non-visual based abnormal behavior detectors.

2. The method of claim 1, wherein the one or more abnormal behaviors include not keeping up with the robot, and the determining the human is in the one or more abnormal behaviors in response to the immediate size of the face being smaller than the initial size of the face comprises:

determining the human as not keeping up with the robot in response to the immediate size of the face being smaller than the initial size of the face, wherein when a difference between the immediate size of the face and the initial size of the face is less than a threshold, the immediate size of the face is determined to be smaller than the initial size of the face; and the performing the one or more responses corresponding to the one or more abnormal behaviors in response to the human being in the one or more abnormal behaviors comprises:

slowing down the robot in response to the human not keeping up with the robot.

3. The method of claim 1, wherein the one or more abnormal behaviors include having abandoned the robot and the one or more responses include stopping the robot, and the determining the human is in the one or more abnormal behaviors in response to the immediate size of the face being smaller than the initial size of the face comprises:

determining the human as having abandoned the robot in response to the face of the human having not detected during the robot aiding the human to move; and the performing the one or more responses corresponding to the one or more abnormal behaviors in response to the human being in the one or more abnormal behaviors comprises:

stopping the robot in response to the human having abandoned the robot.

4. The method of claim 1, wherein the method further comprises:

identifying a plurality of key points on the face using a predefined machine-learned model;

detecting one or more drowsy features of the face based on the key points, wherein one or more drowsy features represent drowsiness; and determining the human as drowsy in response to having detected the one or more drowsy features.

5. The method of claim 4, wherein the one or more drowsy features of the face include a drooping pose, and the detecting the one or more drowsy features of the face based on the key points comprises:

estimating a pose of the face based on the key points; and
determining whether the pose of the face is the drooping pose;

the determining the human as drowsy in response to having detected the one or more drowsy features comprises:

determining the human as drowsy in response to the pose of the face being the drooping pose.

6. The method of claim 5, wherein the camera is an RGB camera, and the estimating the pose of the face based on the key points comprises:

estimating a depth related to a 2D image produced by the RGB camera using a Euclidean distance between the key points based on a preset inter-pupillary distance and an intrinsic of the camera; and estimating the pose of the face based on the 2D image and the estimated depth information.

7. The method of claim 4, wherein the one or more drowsy features of the face include a percentage of closure of eyes on the face being greater than a preset threshold, and the detecting the one or more drowsy features of the face based on the key points comprises:

calculating the percentage of closure of the eyes on the face over a preset time window based on the key points; and determining whether the percentage of closure of the eyes over the preset time window is greater than the threshold;

the determining the human as drowsy in response to having detected the one or more drowsy features comprises:

determining the human as drowsy in response to the percentage of closure of the eyes over the preset time window being greater than the threshold.

8. The method of claim 1, wherein the initial size of the face is a size of the face at a moment of the robot starting to aid the human to move, and the immediate size of the face is a size of the face after the moment.

9. The method of claim 8, wherein the detecting, through the camera, the face of the human during the robot aiding the human to move comprises:

detecting, through the camera, the face of the human using a predefined machine-learned model during the robot aiding the human to move; and before comparing the initial size of the face and the immediate size of the face, the method further comprises:

generating a first bounding box to mark the face in an image produced by the camera at the moment using the predefined machine-learned model in response to the robot starting to aid the human to move;

calculating the initial size of the face based on the first bounding box;

generating a second bounding box to mark the face in another image produced by the camera after the moment using the predefined machine-learned model; and calculating the immediate size of the face based on the second bounding box.

10. The method of claim 1, wherein weights of the weighted sum are determined through supervised machine learning or hand tuning.

11. A mobility aid robot, comprising:

at least a gripping part disposed toward a body of a human for the human to grip;

a camera disposed toward the body of the human to shoot a face of the human;

one or more processors; and one or more memories storing one or more programs configured to be executed by the one or more processors, wherein the one or more programs comprise instructions for:

planning a trajectory for the robot to move from a starting point to a destination, and controlling the robot to move according to the trajectory;

detecting, through the camera, the face of the human during the robot aiding the human to move;

comparing an initial size of the face and an immediate size of the face in response to the face of the human having detected during the robot aiding the human to move;

determining the human is in one or more abnormal behaviors in response to the immediate size of the face being smaller than the initial size of the face; and performing one or more responses corresponding to the one or more abnormal behaviors in response to the human being in the one or more abnormal behaviors, wherein the one or more responses include slowing down the robot;

wherein the one or more abnormal behaviors comprise drowsiness, and the performing the one or more responses corresponding to the one or more abnormal behaviors in response to the human being in the one or more abnormal behaviors comprises:

adjusting the trajectory in response to the human being drowsy; and wherein before performing the one or more responses corresponding to the one or more abnormal behaviors, the instructions further configured for:

filtering out a false positive detection from the one or more abnormal behaviors based on a confidence score and detecting results of non-visual based abnormal behavior detectors, wherein the detecting results comprises: a result of heart rate sensing, and results of grip force and torque sensing, skin conductivity, and a motor current used to drive the robot, and the confidence score is computed using a weighted sum of detection factors corresponding to the non-visual based abnormal behavior detectors.

12. The robot of claim 11, wherein the one or more abnormal behaviors include not keeping up with the robot, and the determining the human is in the one or more abnormal behaviors in response to the immediate size of the face being smaller than the initial size of the face comprises:

determining the human as not keeping up with the robot in response to the immediate size of the face being smaller than the initial size of the face; and the performing the one or more responses corresponding to the one or more abnormal behaviors in response to the human being in the one or more abnormal behaviors comprises:

slowing down the robot in response to the human not keeping up with the robot.

13. The robot of claim 11, wherein the one or more abnormal behaviors include having abandoned the robot and the one or more responses include stopping the robot, and the determining the human is in the one or more abnormal behaviors in response to the immediate size of the face being smaller than the initial size of the face comprises:

determining the human as having abandoned the robot in response to the face of the human having not detected during the robot aiding the human to move; and the performing the one or more responses corresponding to the one or more abnormal behaviors in response to the human being in the one or more abnormal behaviors comprises:

stopping the robot in response to the human having abandoned the robot.

14. The robot of claim 11, wherein the one or more programs further comprise instructions for:

identifying a plurality of key points on the face using a predefined machine-learned model;

detecting one or more drowsy features of the face based on the key points, wherein one or more drowsy features represent drowsiness; and determining the human as drowsy in response to having detected the one or more drowsy features.

15. The robot of claim 14, wherein the one or more drowsy features of the face include a drooping pose, and the detecting the one or more drowsy features of the face based on the key points comprises:

estimating a pose of the face based on the key points; and determining whether the pose of the face is the drooping pose;

the determining the human as drowsy in response to having detected the one or more drowsy features comprises:

determining the human as drowsy in response to the pose of the face being the drooping pose.

16. The robot of claim 15, wherein the camera is an RGB camera, and the estimating the pose of the face based on the key points comprises:

estimating a depth related to a 2D image produced by the RGB camera using a Euclidean distance between the key points based on a preset inter-pupillary distance and an intrinsic of the camera; and estimating the pose of the face based on the 2D image and the estimated depth information.

17. The robot of claim 14, wherein the one or more drowsy features of the face include a percentage of closure of eyes on the face being greater than a preset threshold, and the detecting the one or more drowsy features of the face based on the key points comprises:

calculating the percentage of closure of the eyes on the face over a preset time window based on the key points; and determining whether the percentage of closure of the eyes over the preset time window is greater than the threshold;

the determining the human as drowsy in response to having detected the one or more drowsy features comprises:

determining the human as drowsy in response to the percentage of closure of the eyes over the preset time window being greater than the threshold.

18. The robot of claim 11, wherein the initial size of the face is a size of the face at a moment of the robot starting to aid the human to move, and the immediate size of the face is a size of the face after the moment.

19. The robot of claim 18, wherein the detecting, through the camera, the face of the human during the robot aiding the human to move comprises:

detecting, through the camera, the face of the human using a predefined machine-learned model during the robot aiding the human to move; and before the comparing the initial size of the face and the immediate size of the face, the method further comprises:

generating a first bounding box to mark the face in an image produced by the camera at the moment using the predefined machine-learned model in response to the robot starting to aid the human to move;

calculating the initial size of the face based on the first bounding box;

generating a second bounding box to mark the face in another image produced by the camera after the moment using the predefined machine-learned model; and calculating the immediate size of the face based on the second bounding box.

20. The method of claim 1, wherein the trajectory is adjusted for shorting the navigation path or navigating the robot to a room of the human.

* * * * *